Sept. 24, 1963     S. E. FISHER     3,104,648
ANIMAL TOY
Filed Feb. 26, 1962

Stanton E. Fisher
INVENTOR

BY Hyman F. Glass
ATTORNEY

United States Patent Office 3,104,648
Patented Sept. 24, 1963

3,104,648
ANIMAL TOY
Stanton E. Fisher, 706 Lantern, St. Louis, Mo.
Filed Feb. 26, 1962, Ser. No. 175,573
2 Claims. (Cl. 119—29)

This invention relates to an animal toy in the shape of a dumbbell or bone, one knob of which is of a larger diameter than the other (also referred to herein as "unsymmetrical dumbbell"). This invention also relates to an animal toy of olefactory appeal, for example, having a garlic-like odor.

The unsymmetrical animal toy of this invention is unique in that it does not roll away from the animal but rolls in a circular or arc-like manner. Animals are intrigued by this toy since a force applied thereto causes the unsymmetrical dumbbell to roll in a circular manner rather than away from the animal.

The animal toy can be made of any natural or synthetic material, for example, a plastic or resin such as nylon, polyethylene, polypropylene, polyesters, rubber, rawhide, combinations thereof, etc., provided animals like the material and it is not injurious to them.

The knobs of the animal toy should be constructed so that they are capable of rolling. The length and diameter of the crossbar can vary widely depending for example on the particular animal such as a length of from 2 inches or less to 10 inches or more but preferably 4–6 inches with a diameter of 1/8 inch or less to 2 inches or more, but preferably 1/4–1 inch. The diameter of the knobs can also vary widely for example from 1/4 inch or less to three inches or more, but preferably 1/2–2 inches. The ratio of knob diameters can vary from 1.2 to 3 or more, but preferably 1.5–2. The above figures are for purposes of illustration and not of limitation.

Various olefactory appealing ingredients to which animals are attracted may be imparted to the toy, for example, garlic-like odors. A garlic-like odor may be imparted to the animal toy either alone or in combination with other ingredients such as meat odors and the like.

Although animals will find the garlic impregnated animal toy appealing, whether the knobs are of the same or different diameter, by employing knobs of different diameters, the toy is made doubly attractive since it not only has an olefactory but also kinetic appeal resulting from its circular motion.

The following examples are presented for purposes of illustration and not of limitation.

Example 1

Figure 1:
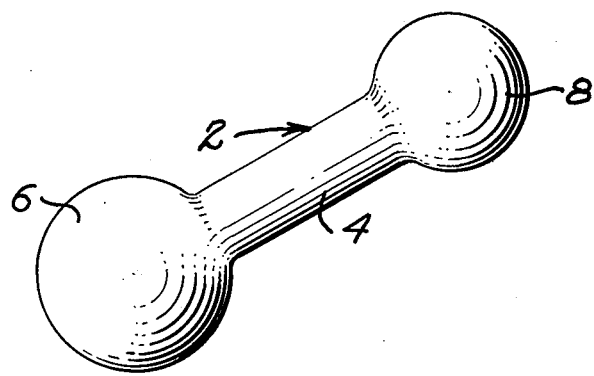
FIGURE 1 is a view in perspective of the animal toy of my invention.
Figure 2:
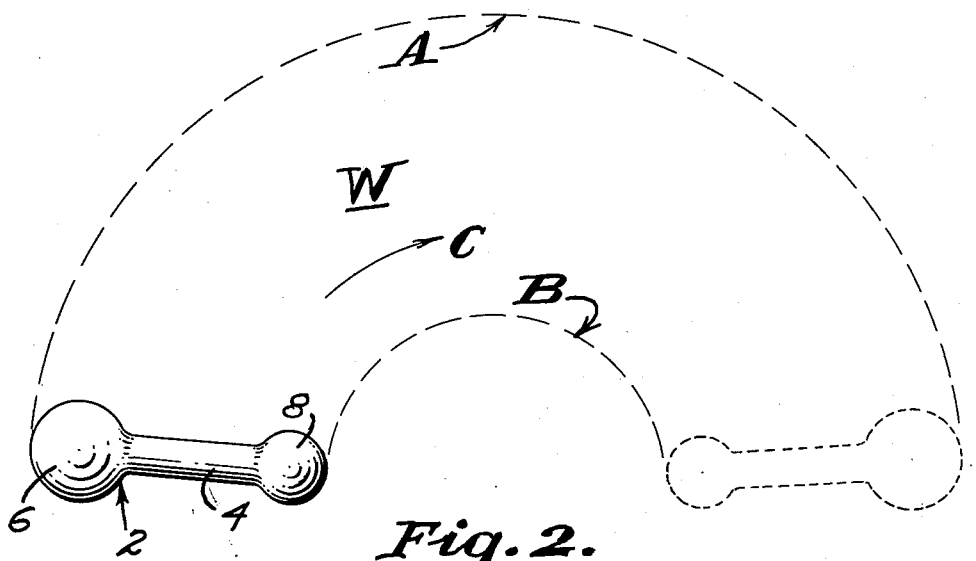
FIGURE 2 is a view in perspective showing the circular path of the animal toy in rolling.

Nylon dumbbell 2 having cross bar 4, 5 in. long and a 1/2 in. diameter, and knob 6 of 1.5 inch diameter and knob 8 of 1 inch diameter rolled in a circular manner, as clearly shown in FIGURE 2. It was found to be appealing to dogs. Whereas a corresponding dumbbell shape having equal diameter knobs rolled away from the dog, the unsymmetrical dumbbell rolled in a circular manner.

Example 2

The dumbbells of Example 1, both symmetrical and unsymmetrical, were impregnated with a garlic odor. Both products appealed to dogs. However, the unsymmetrical product was doubly appealing since its circular motion as well as its garlic flavor appeals to dogs.

Dumbbell 2 having a cross bar 4 and unsymmetrical shaped knobs 6 and 8 follows a circular or arcuate path in the direction of arrow C, as clearly shown by path W defined by the dotted lines A and B in FIGURE 2, on rolling.

Having thus described my invention what I claim as new and desire to obtain by Letters Patent is:

1. An unsymmetrically dumbbell shaped animal toy comprising a cross bar and a pair of spaced-apart knobs integral therewith, one of said knobs having a diameter greater than the diameter of the other of said knobs, said animal toy being capable of easy rolling in an arcuate path.

2. An unsymmetrically dumbbell shaped animal toy comprising a cross bar and a pair of spaced-apart knobs integral therewith, one of said knobs having a diameter greater than the diameter of the other of said knobs, said animal toy being impregnated with a garlic-like odor, said animal toy being capable of easy rolling in an arcuate path.

References Cited in the file of this patent

UNITED STATES PATENTS

| | | |
|---|---|---|
| 2,185,547 | Fowler | Jan. 2, 1940 |
| 2,610,851 | Jones | Sept. 16, 1952 |
| 2,988,045 | Fisher | June 13, 1961 |